3,061,547
**HYDRAULIC FLUID COMPOSITION AND THICK-
ENING AGENT THEREFOR**
John D. Brandner, Arden, Del., assignor to Atlas Chemical Industries, Inc., Wilmington, Del., a corporation of Delaware
No Drawing. Filed Jan. 17, 1955, Ser. No. 482,391
9 Claims. (Cl. 252—77)

This invention relates to hydraulic fluid compositions and to viscosity controlling agents for such fluids. More particularly it relates to non-flammable hydraulic fluid compositions which are stable to hydrolytic decomposition.

It is an object of the invention to produce novel chemical compounds.

Another object is to provide compounds which are viscosity improvers in aqueous fluids suitable as hydraulic fluids.

Still another object is to provide viscosity improvers which are chemically stable.

A further object is to provide hydraulic fluid compositions which are non-flammable and which are resistant to hydrolytic decomposition.

The above and other objects will become apparent in the course of the following description of the invention and in the appended claims.

In accordance with the invention novel polyoxyethylene ethers are provided, which compounds are di-ethers of dimeric unsaturated fatty alcohols. The said dimeric unsaturated fatty alcohols are known in the art and their production is described in U.S. Patent 2,413,612. The preferred ethers are those of dilinoleyl alcohol. The polyoxyethylene ethers of the invention may be made by etherification reaction between preformed polyethylene glycols and dilinoleyl alcohol, or other dimeric unsaturated fatty alcohol. Preferably, however, the ethers are prepared by the direct addition of ethylene oxide to the dimeric alcohol. Within the purview of the invention are ethers containing a plurality of oxyethylene groups per mol of dimeric alcohol. Thus by condensing only two to four mols of ethylene oxide with dilinoleyl alcohol there are obtained products which are essentially oil soluble with slight hydrophilic character. As the number of oxyethylene groups is increased the tendency towards water solubility of the ethers increases. Compounds containing more than about 12 oxyethylene groups per mol of dilinoleyl alcohol are completely miscible with water. For employment as viscosity improvers in the hydraulic fluids of the invention, suitable polyoxyethylene ethers are those of dimers of 18 carbon unsaturated alcohols which contain from 12 to 28 oxyethylene groups per mol. Details of the preparation of several such polyoxyethylene ethers are presented in the following illustrative examples.

*Example 1*

200 grams of dilinoleyl alcohol and 1.04 grams of sodium methylate were charged into a 1 liter autoclave equipped with a stirrer, cooling coils, heating coils and facilities for flushing with an inert gas. The stirrer was started and the air above the mixture flushed with a flow of nitrogen under 10 pounds per square inch pressure. The contents of the autoclave was heated to 140° C., residual nitrogen was vented and ethylene oxide introduced until the pressure reached 50 pounds per square inch. At this point an exothermic reaction began which was allowed to continue until the pressure dropped to 30 pounds per square inch. Ethylene oxide was again introduced in increments to maintain the pressure between 50 and 30 pounds per square inch until a total of 320 grams was added. The charge was maintained at reaction temperature until the pressure dropped to 0 pound per square inch, indicating substantially complete reaction. The yield was 517 grams. Any unreacted ethylene oxide was removed from the preparation by maintaining it at 120° C. under a pressure of 10 mm. of mercury for 30 minutes. The product was a rather viscous oily liquid of pale yellow color. It was the polyoxyethylene ether of dilinoleyl alcohol containing an average of 20 oxyethylene groups per mol.

*Example 2*

The polyoxyethylene ether of dilinoleyl alcohol containing 12 oxyethylene groups per mol was prepared as described in Example 1 except that the charge weights and yield were as follows.

Charge weights:
    202.3 grams dilinoleyl alcohol
    0.8 gram sodium methylate
    194.5 grams ethylene oxide
Yield: 390 grams yellow oily liquid

*Example 3*

The polyoxyethylene ether of dilinoleyl alcohol containing 15 oxyethylene groups per mol was prepared as described in Example 1 except that the charge weights and yield were as follows.

Charge weights:
    201.3 grams dilinoleyl alcohol
    0.9 gram sodium methylate
    241.8 grams ethylene oxide
Yield: 435.6 grams yellow oily liquid

*Example 4*

The polyoxyethylene ether of dilinoleyl alcohol containing 28 oxyethylene groups per mol was prepared as described in Example 1 except that the charge weights and yield were as follows.

Charge weights:
    183 grams dilinoleyl alcohol
    1.2 grams sodium methylate
    410 grams ethylene oxide
Yield: 586.1 grams yellow oily liquid The polyoxyethylene ethers of dimeric alcohols containing from 12 to 28 oxyethylene groups per mol are superior thickening agents or viscosity improvers for aqueous hydraulic fluid compositions. The base liquids for such compositions conventionally contain, besides water, one or more of the lower glycols and/or other water soluble organic compounds such, for example, as formamide, the mono lower alkyl ethers of ethylene and of diethylene glycol and the like. Specific glycols which may be employed include ethylene glycol, propylene glycol, diethylene glycol, hexylene glycol, butylene glycol and the like.

The hydraulic fluids of the invention preferably contain not more than 50% water and from 5% to 25% of the polyoxyethylene ether above described, the balance of the composition being selected from among the several glycols and other organic compounds above named. The lower limit of water content in compositions of the invention is variable. In compositions where all the ingredients other than water are oxygenated hydrocarbons (glycols, ethers, and the like) at least 35% water is desirable to make the compositions non-flammable. If formamide (or other flame retarding component) is employed, the minimum permissible water content may be reduced in proportion as the formamide content is increased. In any event the composition of the invention contains at least 15% water.

When employing as thickening agent polyoxyethylene ethers containing proportions of oxyethylene radicals in the lower part of the above-designated range separation of phases may be encountered unless a glycol of high carbon to oxygen ratio is employed in the solvent. Thus, when employing the polyoxyethylene ether of dilinoleyl alcohol containing 12 oxyethylene groups, there should be at least 10%, and preferably 15% of hexylene glycol or other higher carbon-to-oxygen ratio glycol.

Specific hydraulic fluid compositions illustrative of those encompassed by the invention are presented in tabular form below. The compositions may be prepared by combining the several ingredients in any order. Viscosities in centistokes at 100° F. and 130° F. are tabulated for the several compositions. In the tabulation the abbreviations "20–OE, 15–OE" etc. designate polyoxyethylene ethers containing 20, 15, etc., oxyethylene groups per mol.

| Example No. | Composition | Viscosities at— | |
|---|---|---|---|
| | | 100° F. | 130° F. |
| 5 | 16% water, 24% formamide, 40% ethylene glycol, 20% 20–OE dilinoleyl alcohol. | 35.1 | 27.7 |
| 6 | 39% water 51% ethylene glycol, 10% 20–OE dilinoleyl alcohol. | 40.6 | 38.4 |
| 7 | 30.9% water, 18.2% formamide, 41.9% ethylene glycol, 9% 20–OE dilinoleyl alcohol. | 8.6 | 7.1 |
| 8 | 39% water, 47% ethylene glycol, 14% 20–OE dilinoleyl alcohol. | 129.3 | 85.2 |
| 9 | 19% water, 28.5% formamide, 47.5 ethylene glycol, 5% 20–OE dilinoleyl alcohol. | 4.0 | 3.0 |
| 10 | 50% water, 15% diethylene glycol, 15% hexylene glycol, 20% 20–OE dilinoleyl alcohol. | 13.5 | 8.0 |
| 11 | 17% water, 25.5% formamide, 42.5% ethylene glycol, 15% 15–OE dilinoleyl alcohol. | 89.1 | 51.0 |
| 12 | 18% water, 27% formamide, 45% ethylene glycol, 10% 15–OE dilinoleyl alcohol. | 26.5 | 22.2 |
| 13 | 19% water, 28.5% formamide, 47.5% ethylene glycol, 5% 15–OE dilinoleyl alcohol. | 9.1 | 8.0 |
| 14 | 50% water, 15% diethylene glycol, 15% hexylene glycol, 20% 15–OE dilinoleyl alcohol. | 22.6 | 12.6 |
| 15 | 50% water, 15% diethylene glycol, 15% hexylene glycol, 20% 12–OE dilinoleyl alcohol. | 53.9 | 22.7 |

The above compositions are presented for illustrative purposes only and the invention is not limited to the hydraulic fluids so defined.

What is claimed is:

1. A polyoxyethylene ether of dilinoleyl alcohol containing from about 12 to about 28 mols of ethylene oxide per mol of dilinoleyl alcohol.

2. A polyoxyethylene ether of dilinoleyl alcohol containing from about 15 to about 28 oxyethylene groups per mol.

3. A hydraulic fluid composition comprising a solution consisting essentially of from 35% to 50% by weight of water, from 5% to 25% by weight of a polyoxyethylene ether of dilinoleyl alcohol containing from 12 to 28 oxyethylene groups per mol of dilinoleyl alcohol, the balance to 100% being ethylene glycol.

4. A hydraulic fluid composition comprising a solution consisting essentially of from 15% to 40% by weight of water, from 18 to 30% by weight of formamide, from 5% to 25% by weight of a polyoxyethylene ether of dilinoleyl alcohol containing from 12 to 28 oxyethylene groups per mol of dilinoleyl alcohol, the balance to 100% being a lower alkylene glycol.

5. A hydraulic fluid composition consisting essentially of about 50% by weight of ethylene glycol, about 40% by weight of water and about 10% by weight of dilinoleyl alcohol-ethylene oxide condensate containing about 20 mols of ethylene oxide per mol of dilinoleyl alcohol.

6. A hydraulic fluid composition consisting essentially of

| | Percent |
|---|---|
| Water | 16 |
| Formamide | 24 |
| Ethylene glycol | 40 |
| Polyoxyethylene ether of dilinoleyl alcohol containing 20 oxyethylene groups per mol of dilinoleyl alcohol | 20 |

7. A hydraulic fluid composition consisting essentially of

| | Percent |
|---|---|
| Water | 39 |
| Ethylene glycol | 51 |
| Polyoxyethylene ether of dilinoleyl alcohol containing 20 oxyethylene groups per mol of dilinoleyl alcohol | 10 |

8. A hydraulic fluid composition consisting essentially of

| | Percent |
|---|---|
| Water | 17.0 |
| Formamide | 25.5 |
| Ethylene glycol | 42.5 |
| Polyoxyethylene ether of dilinoleyl alcohol containing 15 oxyethylene groups per mol of dilinoleyl alcohol | 15.0 |

9. A hydraulic fluid composition consisting essentially of

| | Percent |
|---|---|
| Water | 50 |
| Diethylene glycol | 15 |
| Hexylene glycol | 15 |
| Polyoxyethylene ether of dilinoleyl alcohol containing 15 oxyethylene groups per mol of dilinoleyl alcohol | 20 |

References Cited in the file of this patent

UNITED STATES PATENTS

| | | |
|---|---|---|
| 1,970,578 | Schoeller et al. | Aug. 21, 1934 |
| 2,413,612 | Eckey et al. | Dec. 31, 1946 |
| 2,462,694 | Walker | Feb. 22, 1949 |
| 2,673,882 | Griffin | Mar. 30, 1954 |
| 2,706,207 | Schnell et al. | Apr. 12, 1955 |
| 2,755,251 | Barker | July 17, 1956 |
| 2,758,976 | Barker | Aug. 14, 1956 |